United States Patent [19]

Stacy

[11] Patent Number: 4,855,746
[45] Date of Patent: Aug. 8, 1989

[54] MULTIPLE DEVICE REMOTE CONTROL TRANSMITTER

[75] Inventor: Carl W. Stacy, Elmwood Park, Ill.

[73] Assignee: Zenith Electronics Corporation, Glenview, Ill.

[21] Appl. No.: 635,857

[22] Filed: Jul. 30, 1984

[51] Int. Cl.$^4$ .............................................. G08C 19/00
[52] U.S. Cl. ..................................... 341/176; 341/23; 358/194.1
[58] Field of Search ........ 340/365 VL, 365 R, 365 S, 340/696, 825.72, 825.69; 200/333, 329, 322, 155 A, 61.71, 61.73; 358/194.1; 434/229; 455/603, 151; 341/176

[56] References Cited

U.S. PATENT DOCUMENTS 4,398,086  8/1983  Smith ........................... 340/365 VL
4,488,179 12/1984  Kruger et al. .................... 358/194.1
4,539,711 10/1985  Harger ............................ 358/194.1

OTHER PUBLICATIONS

Zenith Radio Corp. Operating and Warranty Manual for Model VRT 9850 (no publishing date).

Primary Examiner—Joseph A. Orsino
Assistant Examiner—Brian Tummi

[57] ABSTRACT

A multi-device remote control transmitter has a first plurality of keys for controlling functions of a TV, a VCR and a Text service. A pair of slidable covers is provided in the housing for movement to two overlapping positions in which different second and third pluralities of keys dedicated to VCR and Text are exposed. Movement of the covers also operates switches which change the coded signals associated with a group of keys in the first plurality of keys for controlling different devices.

5 Claims, 1 Drawing Sheet

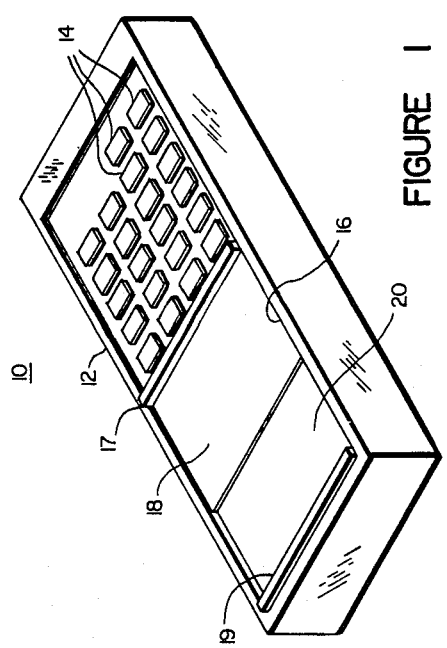
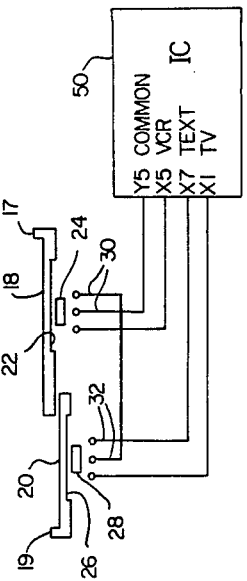
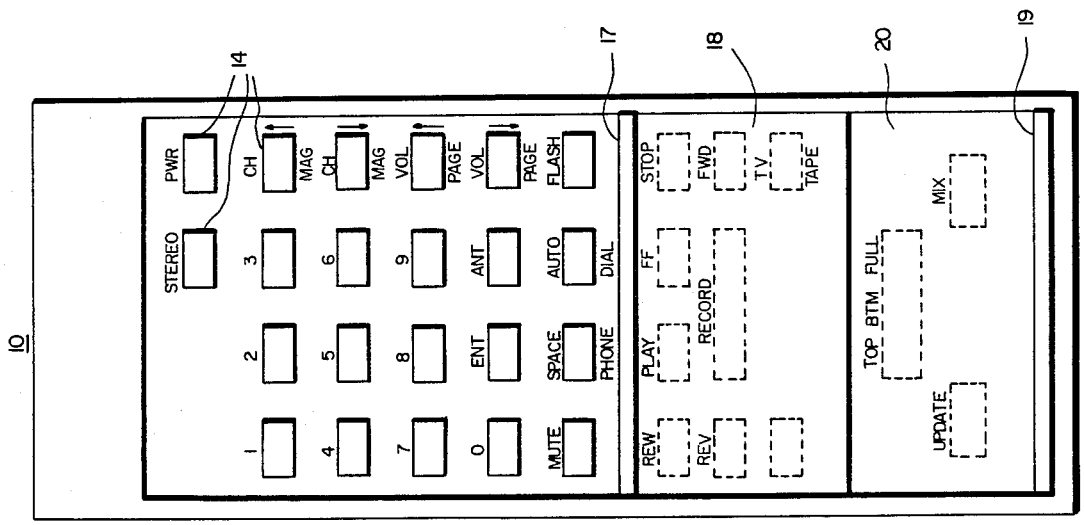
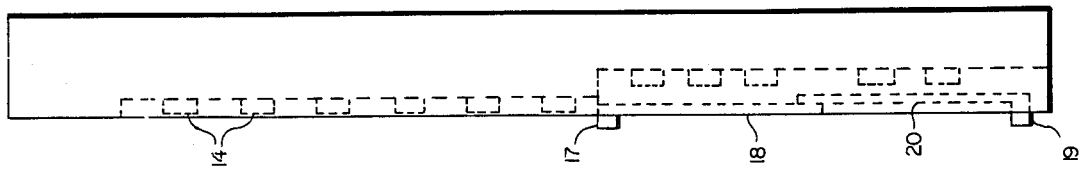

MULTIPLE DEVICE REMOTE CONTROL TRANSMITTER

BACKGROUND OF THE INVENTION AND PRIOR ART

This invention relates, in general, to remote control transmitters for controlling more than one device or apparatus.

The surge in television-related home entertainment services has given rise to a need to remotely control the various devices or functions. Remote control systems for controlling the functions of a television receiver (TV) have long been known. Recently such systems have come into common use for controlling video cassette recorders (VCRs), raising and lowering projection TV viewing screens, changing the orientation of antennas and controlling operation of TV teletext (Text) services. The requirement of a separate transmitter for each controlled apparatus or device is not only costly and cumbersome, but also confusing to the viewer. A number of schemes have been proposed in the prior art to enable control of more than one device by a single hand-held transmitter. Some merely add additional, complete sets of buttons or keys to the transmitter. Others share keys by incorporating device switches that change the function associated with the individual keys. Many difficulties attend such multiple device remote control transmitters, among them being size, complexity and legibility of indicia applied to multi-function keys.

State-of-the-art home entertainment device remote control transmitters are used with microprocessor-based decoder systems in the controlled apparatus that receives and decodes transmitted signals. The transmitter may, for example, include an integrated circuit for generating bursts of infrared energy in a coded digital format for carrying out different control functions. One such well known system is incorporated in Zenith Model No. SC7000, Part No. 124-79, the circuitry of which is hereby incorporated by reference. Use with different controlled devices is enabled by a mode or device switch for changing the coded signals generated in response to actuation of certain keys. Even in that unit, however, the user must remember to note the position of the device switch to preclude inadvertently activating a wrong function or a wrong device.

OBJECTS OF THE INVENTION

A principal object of the invention is to provide a novel remote control transmitter.

A further object of the invention is to provide a remote control transmitter for controlling more than one device that minimizes the likelihood of user error.

SUMMARY OF THE INVENTION

In accordance with the invention a remote control transmitter is arranged for transmitting signals for selectively controlling at least two controlled devices. The transmitter includes a housing having a first plurality of keys for activating functions common to the controlled devices and second and third pluralities of keys for activating functions individual to the controlled devices. Movable cover means are provided on the housing for selectively permitting access to only one of the second and third plurality of keys.

BRIEF DESCRIPTION OF THE DRAWINGS

These and other objects and advantages of the invention will be apparent upon reading the following description in conjunction with the drawings in which:

FIG. 1 is a perspective view of a remote control transmitter constructed in accordance with the invention;

FIG. 2 is a plan view of the remote control transmitter of FIG. 1;

FIG. 3 is a left side view of the transmitter of FIG. 2 with the keys shown in hidden lines; and FIG. 4 is a partial schematic view of a switch arrangement for the moveable covers on the housing.

DESCRIPTION OF THE PREFERRED EMBODIMENT

Referring to FIG. 1, a remote control transmitter 10 includes a generally rectangular housing 12 which carries a plurality of keys 14. Housing 12 defines a rectangular-shaped cut-out 16 in the top thereof in which a pair of movable covers are slidably disposed in overlapping relationship. An upper cover 18 extends over a little more than one-half of the area of cut-out 16 and a lower cover 20 is arranged to extend over slightly more than the remaining area of cut-out 16. The covers may be movably retained in the housing by any well known means. Cover 18 includes an upstanding ledge 17 for enabling sliding movement thereof under control of a user's thumb. A similar upstanding ledge 19 is provided on the opposite end of lower cover 20. It will be appreciated that the covers are individually movable into overlapping relationship, in one instance with cover 18 being stationary and cover 20 moved to a position underlying it and in the other with cover 20 being held in place and cover 18 moved to a position overlying it. Different sets of keys are exposed by movement of the covers.

As best seen by the indicia adjacent the keys on the housing of FIG. 2, the plurality of keys 14 is generally associated with control functions that are common to the different controlled devices, such as digits 0-9, Power, Enter and Mute. The plurality of keys 14 may also include a group of keys that, while being specific to a particular controlled device, may still be used to control a different device. For example, the Channel Up and Channel Down keys apply to TV operation. Yet they apply to magazine selection when the system is in the Text mode. The same is true for the Volume Up and Volume Down for TV operation as well as Page Up and Page Down in the Text mode. Other functions such as Space Phone, which enables use of a telephone through the TV, may be applicable to operation with TV, VCR and Text.

As indicated in FIG. 2, the keys associated with the VCR function are illustrated in hidden lines under upper movable cover 18. Movement of cover 18 downwardly to overly lower cover 20 thus exposes the keys that are dedicated to VCR operation. Similarly, movement of lower cover 20 to a position underlying upper cover 18 exposes keys dedicated to Text operation. During TV operation, both covers are in "home" positions and shield their respective dedicated keys from the user's sight and touch, thus precluding accidental operation.

As shown schematically in FIG. 4, covers 18 and 20 have respective recesses 22 and 26 formed in their undersides. These recesses are elongated to provide lost motion connections with a pair of switches 24 and 28, respectively, which may each be single pole, double throw (SPDT), as illustrated. Switch 24 is operable by movement of cover 18 to connect different sets of contacts 30 together and switch 28 is operable by movement of cover 20 to connect different sets of contact 32 together. The connections indicated refer to a specific Zenith remote control system that is fully described in a copending application of T. Zato and P. Skerlos, Ser. No. 367,877, filed Apr. 12, 1982 entitled "Multi-Function, Multi-Unit Remote Control System and Method Therefor", now U.S. Pat. No. 4,482,947, issued Nov. 13, 1984, which is assigned to the assignee of the present invention. That application is hereby incorporated by reference herein.

As illustrated, the X-1 lead to the integrated circuit (IC) 50 is connectable to the Y-5 common lead on the IC to select coded command signals for the TV operation. The X-7 lead is connectable to the Y-5 lead to select coded commands for the Text mode and the X-5 lead is similarly connectable to Y-5 to control the VCR. It will be appreciated that the arrangement of switches for selective operation by movement of the covers is a matter of design choice. Thus only a rudimentary showing is made for purposes of description. Similarly a mechanical interlock between the switches is now shown as such is also believed to be well within the capabilities of those skilled in the art. The details of the integrated circuitry for generating the coded infrared remote control signals, the battery power source and the infrared transmitter, all situated in the remote control transmitter housing, are not shown for the purposes of clarity.

With the arrangement it will be seen that those keys that are common to the controlled devices, as well as some keys that may be specific to more than one controlled device, are exposed, despite the positions of the slidable covers. The slidable covers are moved to expose keys dedicated to the VCR device or Text operating mode. With the switch arrangement shown, movement of the appropriate cover also conditions the IC to produce the coded signals for that particular function. Thus, when the VCR keys are exposed by sliding cover 18 down, they will interface with the IC to initiate coded signals that are operable with the VCR. Similarly, when cover 20 is moved upward into position, the exposed keys are interfaced with the IC to generate commands operable in the Text mode. With the covers in their home positions, the exposed keys are operable in the TV mode.

With the invention a very simple, relatively unconfusing remote control transmitter for controlling a plurality of controlled devices with minimal potential for user error has been provided. It is recognized that numerous modifications and changes in the described embodiment of the invention will be apparent to those skilled in the art without departing from the true spirit and scope thereof. The invention is to be limited only as defined in the claims.

What is claimed is:

1. A remote control transmitter for selectively transmitting signals for controlling at least two different devices comprising:
   a housing;
   a first plurality of keys on said housing for activating functions common to said devices, some of said first plurality of keys being capable of activating two different control functions;
   a second and third plurality of keys on said housing for activating functions individual to said devices;
   cover means on said housing for prohibiting simultaneous access to said second and to said third plurality of keys;
   an integrated circuit for generating coded control signals; and
   means, including switch means operable by movement of said cover means, for enabling transmission of different coded control signals for activating said different devices and said different control functions by changing connections between said integrated circuit and certain of said keys.

2. The transmitter of claim 1 wherein said cover means comprise two covers mounted for slidable overlapping engagement in said housing and wherein said second and third plurality of keys are located beneath said movable covers respectively.

3. The transmitter of claim 2 wherein said first plurality of keys control functions of a television receiver, said second plurality of keys control functions of a VCR and said third plurality of keys are useful in a Text mode.

4. The transmitter of claim 3 wherein said first plurality of keys includes a group of keys, each of which controls a function in two controlled devices;
   said switch means operated by movement of said cover means for reconnecting said integrated circuit to produce appropriate coded control signals for said group of keys; and
   indicia means for identifying said functions with said keys.

5. A remote control transmitter including an integrated circuit for transmitting coded control signals for controlling functions of a TV device, a VCR device and a Text service comprising:
   a housing including a first plurality of keys for initiating control signals for controlling functions of said TV device, VCR device and Text service, some of said first plurality of keys being capable of activating two different control functions;
   second and third pluralities of keys in said housing for enabling transmission of control signals useful for activating and controlling functions of said VCR device and said Text service, respectively;
   a pair of slidably mounted covers on said housing for hiding said second and third plurality of keys when in a home position and for selectively exposing said second and third plurality of keys when in either of two overlapping positions; and
   switch means operable by said slidable covers for conditioning said integrated circuit to transmit coded control signals for activating said devices and for activating said different control functions in accordance with the position of said movable covers.

* * * * *